US 12,034,351 B2

(12) United States Patent
Eriksen

(10) Patent No.: US 12,034,351 B2
(45) Date of Patent: Jul. 9, 2024

(54) ELECTROMECHANICAL ACTUATOR FOR USE UNDER WATER

(71) Applicant: Electrical Subsea & Drilling AS, Straume (NO)

(72) Inventor: Egil Eriksen, Ål (NO)

(73) Assignee: Electrical Subsea & Drilling AS, Straume (NO)

( * ) Notice: Subject to any disclaimer, the term of this patent is extended or adjusted under 35 U.S.C. 154(b) by 63 days.

(21) Appl. No.: 17/926,391

(22) PCT Filed: Jul. 5, 2021

(86) PCT No.: PCT/NO2021/050161
§ 371 (c)(1),
(2) Date: Nov. 18, 2022

(87) PCT Pub. No.: WO2022/010360
PCT Pub. Date: Jan. 13, 2022

(65) Prior Publication Data
US 2023/0187995 A1  Jun. 15, 2023

(30) Foreign Application Priority Data

Jul. 6, 2020 (NO) .................................. 20200771
Jun. 11, 2021 (NO) .................................. 20210760

(51) Int. Cl.
*H02K 5/132* (2006.01)
*H02K 5/10* (2006.01)
*H02K 7/10* (2006.01)

(52) U.S. Cl.
CPC ............... *H02K 5/132* (2013.01); *H02K 5/10* (2013.01); *H02K 7/10* (2013.01)

(58) Field of Classification Search
CPC .... E21B 33/06; E21B 33/0355; E21B 33/064; H02K 2205/09; H02K 5/10; H02K 5/132;
(Continued)

(56) References Cited

U.S. PATENT DOCUMENTS 10,934,790 B2   3/2021   Eriksen
10,982,506 B2   4/2021   Eriksen
(Continued)

FOREIGN PATENT DOCUMENTS

GB   2489019    9/2012
NO   342939     9/2018
(Continued)

OTHER PUBLICATIONS

NO Search Report for 20200771, dated Feb. 5, 2021.
(Continued)

*Primary Examiner* — Naishadh N Desai
(74) *Attorney, Agent, or Firm* — Andrus Intellectual Property Law, LLP

(57) ABSTRACT

An electromechanical actuator with a through-going center passage for use under water, wherein the motor and transmission elements are arranged in parallel with and are via dog elements mechanically coupled to the axially displaceable elements through a scaling partition. A hydraulic axially displaceable piston ring facilitates secondary release of locking segments in a coupling device.

7 Claims, 4 Drawing Sheets

(58) Field of Classification Search
CPC .. H02K 7/06; H02K 7/10; F16H 25/00; F16K 31/04
See application file for complete search history.

(56) References Cited

U.S. PATENT DOCUMENTS

| | | |
|---|---|---|
| 11,454,307 B2 | 9/2022 | Eriksen |
| 2011/0126378 A1* | 6/2011 | Ota .................... F24S 23/80 15/405 |
| 2012/0174895 A1 | 7/2012 | Rabhi |
| 2014/0231685 A1* | 8/2014 | Eriksen ............... F16K 31/56 251/266 |
| 2014/0354096 A1* | 12/2014 | Eriksen ............... H02K 3/28 310/80 |
| 2020/0340562 A1* | 10/2020 | Eriksen ............. F16K 31/508 |

FOREIGN PATENT DOCUMENTS

| | | |
|---|---|---|
| WO | 2011/126378 | 10/2011 |
| WO | 2013/119127 | 8/2013 |
| WO | 2019/078727 | 4/2019 |

OTHER PUBLICATIONS

NO Search Report for 20210760, dated Nov. 1, 2022.
International Search Report and the Written Opinion for PCT/NO2021/050161, dated Sep. 14, 2021.

\* cited by examiner

ELECTROMECHANICAL ACTUATOR FOR USE UNDER WATER

CROSS-REFERENCE TO RELATED APPLICATIONS

This application is the U.S. national stage application of International Application PCT/NO2021/050161, filed Jul. 5, 2021, which international application was published on Jan. 13, 2022, as International Publication WO 2022/010360 in the English language. The International Application claims priority of Norwegian Patent Application Nos. 20210760, filed Jun. 11, 2021 and 20200771, filed Jul. 6, 2020. The international application and Norwegian applications are all incorporated herein by reference, in entirety.

FIELD

The invention concerns an electromechanical actuator for use under water, more specifically wherein an annulus is formed between an actuator housing and a partition, the annulus being delimited in a fluid-sealing manner against a centre passage in the actuator, an electric ring motor is arranged enclosed in the annulus, an axially displaceable actuator element that is enveloped by the partition is dis-placeable along an internal partition portion between a first position and a second position, and a transmission element is arranged in the annulus axially displaceable along an external partition portion and is connected to the electric ring motor via an assembly of further transmission elements. The invention concerns means for transferring the actuator element's axial displacement to actuate one or more elements that surround a centre passage of the actuator.

BACKGROUND

In connection with petroleum extraction at sea it is necessary to be able to manoeuvre actuators that are pro-vided with a centre passage to facilitate through-flow of fluid as well as to allow passage of equipment in connection with various work operations. These are included in other types of subsea equipment like well barrier equipment such as blow-out preventers for drilling and well completion and in subsea production trees for oil and gas production. For these uses, coupling devices are used to lock the equipment in a sealing manner to a subsea well head or for sealing connec-tion of equipment modules. Ring piston actuators are also used for radial compression of a sealing element that can for example grip around a drill string in a sealing manner.

Subsea well barrier equipment and related coupling devices have traditionally been operated hydraulically. Hydraulic operation usually requires hydraulic lines to be fed from the surface. To reduce system complexity and weight, eliminate hydraulic distribution and leakage issues, eliminate the need for hydraulic fluid and obtain increased control functionality, efforts are being made to replace hydraulic actuation with electromechanical actuation of the equipment.

Due to said and other disadvantages of hydraulic systems, electromechanical actuators for use under water have been developed. Such actuators are typically characterised by the fact that they are supplied with several drive systems and are arranged to be manoeuvrable by means of an external rotation unit, for example by a rotation actuator on a remote operated vehicle (ROV).

WO2013/119127 A1 describes an electromechanical actuator that via an actuation element respectively locks or releases a coupling device or compresses or unloads a flexible sealing element. The actuated locking segments, alternatively the sealing element, are placed at an end of an outer housing, while a ring motor and transmission elements are axially displaced in relation to these. Several guide bolts are attached to the actuation element at its one end portion, and extend in the actuator's axial direction through respec-tive bores in an end portion of the actuator housing, the guide bolts being coupled to a locking ring at their opposite end portion. Such a construction is not optimal for mini-mising the total length of the assembly.

SUMMARY

The object of the present invention is to facilitate a geometry where a locking device, alternatively a ring piston, is arranged in parallel with the engine and the transmission elements, as well as provide a hydraulic function for an alternative release of the locking device.

The object is fulfilled by features specified in the descrip-tion below and subsequent patent claims.

An electromechanical actuator for use under water is provided with an electric ring motor that comprises an annular stator and an annular rotor and related transmission elements arranged in a tight, oil-filled annulus in an actuator housing. The transmission elements may comprise a rolling nut that is directly coupled to the ring motor and is in threaded engagement with an actuation ring. Alternatively the transmission elements may include a planetary gear between the engine and a rolling nut in threaded engagement with an actuation ring.

The annulus is delimited by the actuator housing and a partition that seals against a centre passage in the actuator, where actuatable elements are arranged. In an embodiment, the actuatable elements are made up of a number of locking segments that are enclosed by a locking ring that sealingly abuts an inside of the partition and can be moved axially via a mechanical connection through the partition of the actua-tion ring, which in turn sealingly abuts an outside of the partition. In an alternative embodiment, the locking ring can if necessary be pushed back by means of a hydraulic axially displaceable piston ring arranged at an end portion of the actuator housing. In an alternative embodiment of the actua-tor, a ring piston sealingly abuts the inside of the partition and is arranged to be able to compress a flexible, annular sealing element as the ring piston is moved axially via a mechanical connection through the partition of the actuation ring.

The invention is defined by the independent patent claims. The dependent claims define advantageous embodiments of the invention.

More specifically, the invention concerns an electrome-chanical actuator for use under water, wherein an annulus is formed between an actuator housing and a partition, the annulus being delimited in a fluid-sealing manner against a centre passage in the actuator, an electric ring motor is arranged enclosed in the annulus, an axially displaceable actuator element that is enveloped by the partition is dis-placeable along an internal par-tition portion between a first position and a second position, a transmission element is arranged in the annulus axially displaceable along an external partition portion and is connected to the electric ring motor via an assembly of further transmission elements, characterised in that
the axially displaceable actuator element is connected to the axially dis-placeable transmission element by one or more dog elements that extend in the radial direction of the actuator through respective slits in the partition, each slit having an extent in the axial direction of the actuator that facilitates a displacement of the respective dog element in the axial direction of the actuator in accordance with the axially displaceable actuator element's said first and second position.

A first end portion of the at least one dog element may be in engagement with a recess in the actuation ring, and a second end portion of the at least one dog element may be in engagement with an assembly channel in the axially displaceable actuator element. An advantage of this is that the at least one dog element can be guided to engagement with the actuation ring and the axially displaceable actuator element from the centre passage.

The second end portion of the at least one dog element may be arranged to be held in a recess in the assembly channel by a plug being inserted into the assembly channel for locking engagement with the assembly channel and the second end portion of the dog element. An advantage of this is that the at least one dog element is locked from the centre passage.

The axially displaceable actuator element may be a locking ring arranged for radial movement by locking segments that are arranged in the centre passage of the actuator. An advantage of this is that the actuator can be used to grip, hold and release an element that has been inserted into the centre passage of the actuator.

The locking ring may be provided with radially inward-protruding, heightened first and second end collar portions that are arranged to abut in a supporting manner radially outward-facing side faces and end portions of the locking segments, said end collar portions, in the locking ring's first, locking end position, being arranged to abut against the locking segments' outward-facing side face and the locking segments' heightened second end portion, the locking elements being pushed radially inwards to a gripping position, and said end collar portions, in the locking ring's second, releasing end position, are arranged to abut against the locking segments' tapered first end portion and the outward-facing side face, the locking elements being pulled radially outwards to a non-gripping position. An advantage of this is that the gripping and releasing function of the actuator is directly and unequivocally related to the two end positions of the locking ring.

A hydraulic, axially displaceable piston ring that surrounds a cylindrical end portion of a neck on a coupling flange may be arranged to push a locking ring in the axial direction of the actuator to release the locking segments' locking grip on an element disposed in the centre passage of the actuator. An advantage of this is that the actuator is set more quickly into its releasing state.

The axially displaceable actuator element may be a ring piston arranged to compress an annular sealing element against an end cover at an end portion of the centre passage of the actuator. An advantage of this is that the actuator can be arranged for alternative use.

BRIEF DESCRIPTION OF THE DRAWINGS

In the following, examples are described of preferred embodiments of the present invention, which are illustrated in the attached drawings, wherein.

DETAILED DESCRIPTION OF THE DRAWINGS

Figure 1:
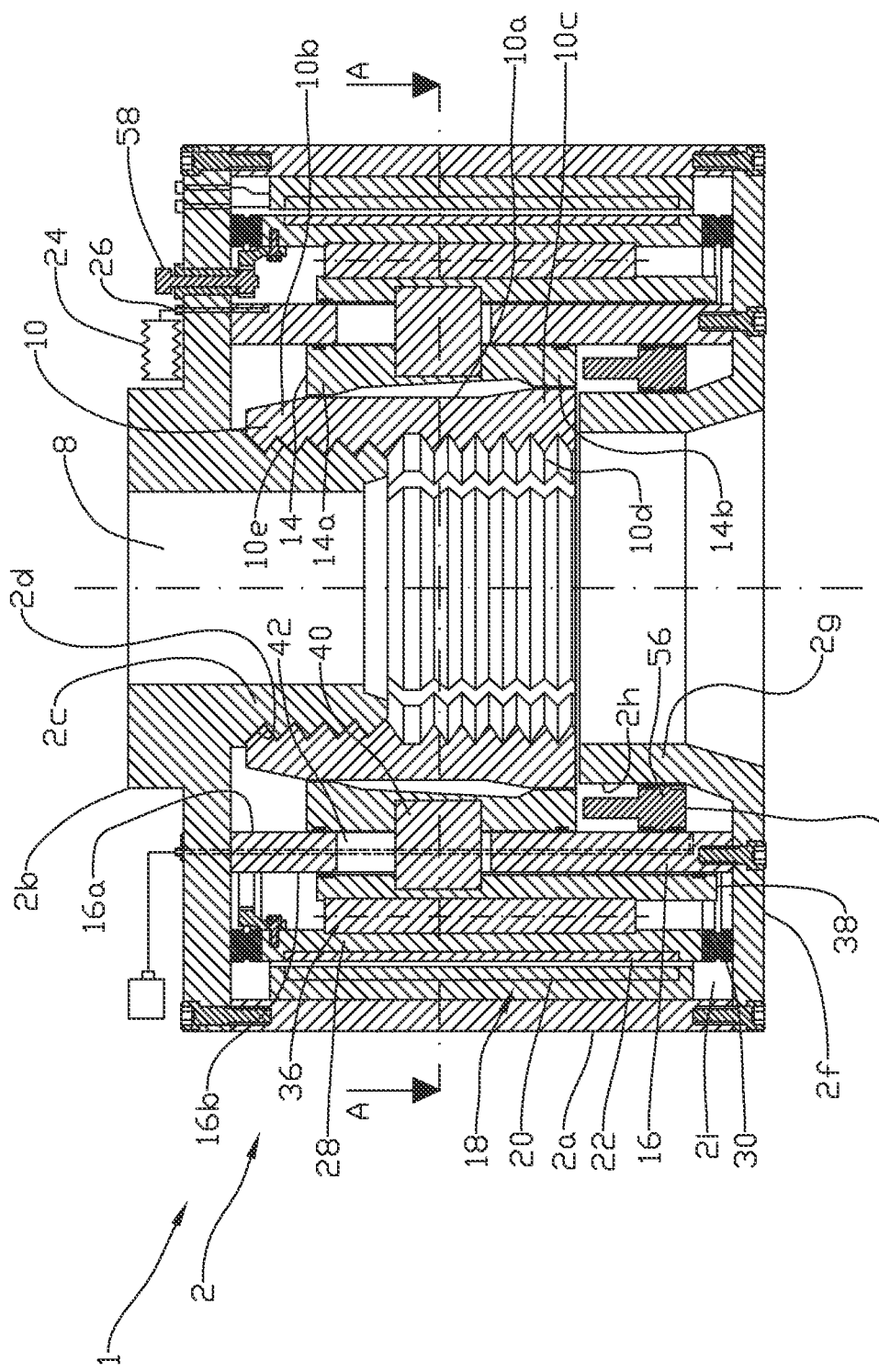
FIG. 1 shows in an axial section a first embodiment example of an annular actuator with power transmission from a ring motor and transmission elements for actuation of a locking device that comprises several locking segments arranged about a centre passage in the actuator.

All position indicators refer to the position shown on the figures.

Similar or corresponding elements are specified with the same reference number on the figures. For the sake of clarity some elements may be shown without reference numbers on some of the figures.

A skilled person will understand that the drawings are only principle drawings. The relative sizes of the different elements may be distorted.

On the drawings the reference number 1 indicates an annular actuator arranged in a cylindrical actuator housing 2.

Reference is first made to FIGS. 1, 2, 3a and 3b, which show axial sections, respectively radial sections through the actuator 1, wherein the actuator housing 2 is formed of a cylindrical external wall 2a, which at a first end portion is releasably coupled to an assembly flange 2b and at a second end portion is releasably coupled to a coupling flange 2f. The assembly flange 2b is provided with an assembly flange neck 2c that protrudes inwards in the actuator housing 2. The coupling flange 2f is provided with a coupling flange neck 2g with an external cylindrical end portion 2h. The coupling flange neck 2g protrudes inward in the actuator housing 2. The assembly flange 2b is arranged for connection with a subsea equipment module that is not shown here. The coupling flange 2f is arranged for connection with a well head that is not shown here. The actuator 1 is provided with a through-going, axial centre passage 8.

A number of locking segments 10 are distributed about the assembly flange neck 2c. The locking segments 10 are provided with radially inward-facing locking portions 10e that are in engagement with corresponding engagement portions 2d on the periphery of the assembly flange neck 2c and are kept in place by a first axially displaceable element, herein shown as a locking ring 14. Each locking segment 10 has a first end portion 10b with an outward-facing side face 10a, wherein the end portion 10b is tapered in a radial direction, and opposite the first end portion 10b, a second end portion 10c that is heightened in a radial direction. A locking segment portion that freely faces the centre passage 8 between the necks 2c, 2g of the assembly flange 4 and the coupling flange 6, forms gripping surfaces 10d that are toothed or in some other way formed to abut in a locking manner an element that is to be held in a fixed grip.

The locking ring 14 has an external cylindrical shape and is provided internally with radially inward-protruding, heightened first and second end collar portions 14a, 14b that are arranged to supportingly abut against the locking segments' 10 outward-facing side faces 10*a* and end portions 10*b*, 10*c*. In a first, locking end position, as shown on FIG. 1, said end collar portions 14*a*, 14*b* abut against the locking segments' 10 outward-facing side face 10*a* and the heightened second end portion 10*c*. In a second, releasing end position said end collar portions 14*a*, 14*b* abut against the locking segments' 10 tapered first end portion 10*b* and the outward-facing side face 10*a* and allow the locking elements 10 with its gripping surfaces 10*d* to pull radially outwards to a non-locking position.

In an annulus 2*i* delimited by the actuator housing 2 and a cylindrical partition 16 that in a fluid-sealing manner delimits the actuator housing 2 against the actuator's 1 centre passage 8, an electric ring motor 18 with an external, annular stator 20 and an internal, annular rotor 22 is arranged. The partition 16 can be demountable. The stator 20 is attached to the actuator housing 2. An electromagnetic brake (not shown) with a brake coil is supplied with energy when the motor 18 is started up, whereby a friction ring that normally abuts the rotor 22 is released and frees the rotor 22 for rotation.

The annulus 2*i* is filled with a fluid, typically a silicone oil, and is pressure-compensated against an actuator-surrounding water pressure by means of an elastic pressure compensator 24 that communicates with the annulus 2*i* via a channel 26 through the assembly flange 2*b*.

A first transmission element in the form of a rolling nut 28 is arranged radially inside the rotor 22 and is attached to it. The rotor 22 is together with the rolling nut 28 supported in a radial and axial direction by means of rotor bearings 30 arranged at the end portions of the rotor 22 and the rolling nut 28. The rolling nut 28 rotates together with the rotor 22.

The rolling nut 28 is provided with second transmission elements in the form of axially arranged, supported thread rollers 36. The thread rollers 36 that are arranged to be able to rotate freely about their own length axis in the rolling nut 28, are distributed about and are engaged with external threads on an actuation ring 38. The actuation ring 38 surrounds a portion of the partition 16 and is displaceable in the axial direction of the partition 16. The rolling nut 28, the thread rollers 36 and the actuation ring 38, possibly in combination with the planetary gear 32 (see FIG. 2), thereby comprises transmission elements for conversion of a torque provided by the ring motor 18 to axial displacement of the actuation ring 38.

Figure 2:
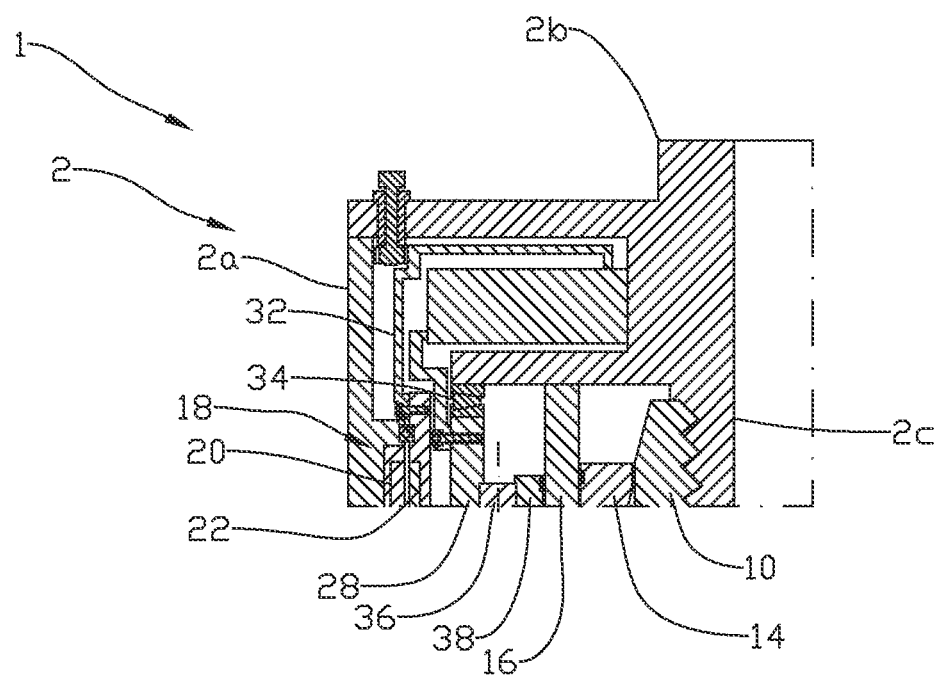
FIG. 2 shows in an axial section a section of a variant of the first embodiment example of the actuator, wherein the transmission elements include a planetary gear.

As shown in FIG. 2, a third transmission element in the form of a planetary gear 32 can be disposed between the rotor 22 and the rolling nut 28, which in this embodiment is supported in a radial and axial direction by means of thereto appropriate rotor bearings 34.

The actuation ring 38, which abuts in a sealing manner the outside of the partition 16, is coupled to the locking ring 14 that abuts in a sealing manner the inside of the partition 16 and surrounds the locking segments 10. The connection between the locking ring 14 and the actuation ring 38 is formed by dog elements 40 that extend through slits 42 in the partition 16 to a locking engagement in the actuation ring 38 and the locking ring 14. The dog elements 40 are shown herein with a plate shape with a width extent in the axial direction of the actuator 1 and a length extent in the radial direction of the actuator 1. The slits 42 have an axial extent (height) that is greater than the width of the dog elements 40 and thereby allow the dog elements 40 to be displaceable in the axial direction of the actuator 1, the peripheral extent (width) of the slits 42 exceeding the thickness of the dog elements 40. The support of the dog elements 40 against the side edges of the slits 42 prevent rotation of the actuation ring 38. When the actuation ring 38 is displaced in the axial direction of the actuator 1 by the ring motor 18 putting the rolling nut 28 into rotation, the axial displacement of the actuation ring 38 is transferred to the locking ring 14 via the dog elements 40. The locking ring 14 thereby causes a radial displacement of the locking segments 10 between a gripping and a releasing position, the gripping surfaces 10*d* being pushed radially towards or pulled radially away from a correspondingly designed portion of a well head profile (not shown) in the centre passage 8.

Figure 3B:
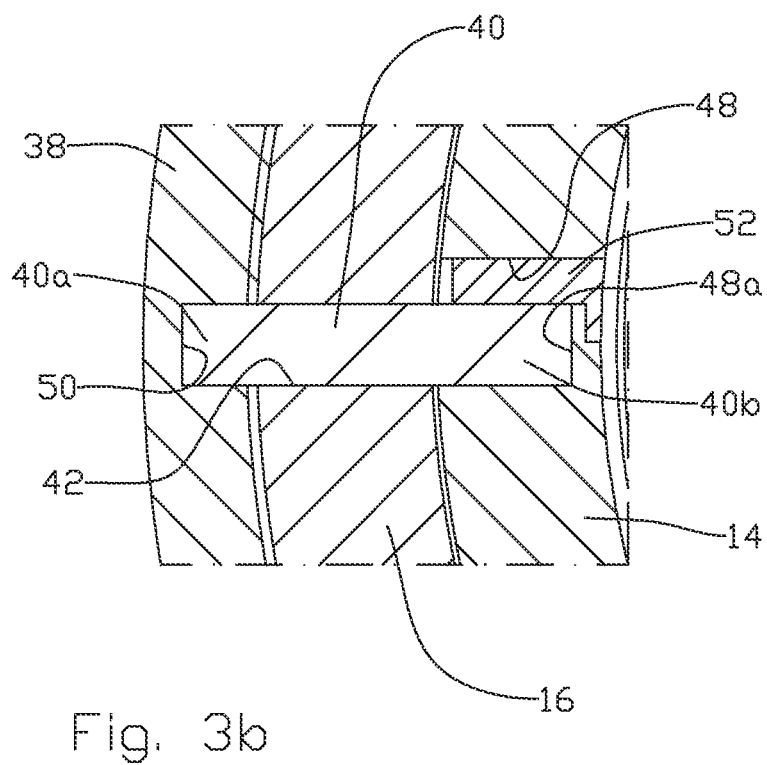
FIG. 3b shows in a larger scale a section of FIG. 3a, wherein a dog element is engaged with a locking ring, is inserted through a partition for engagement in an actuation ring.
Figure 3A:
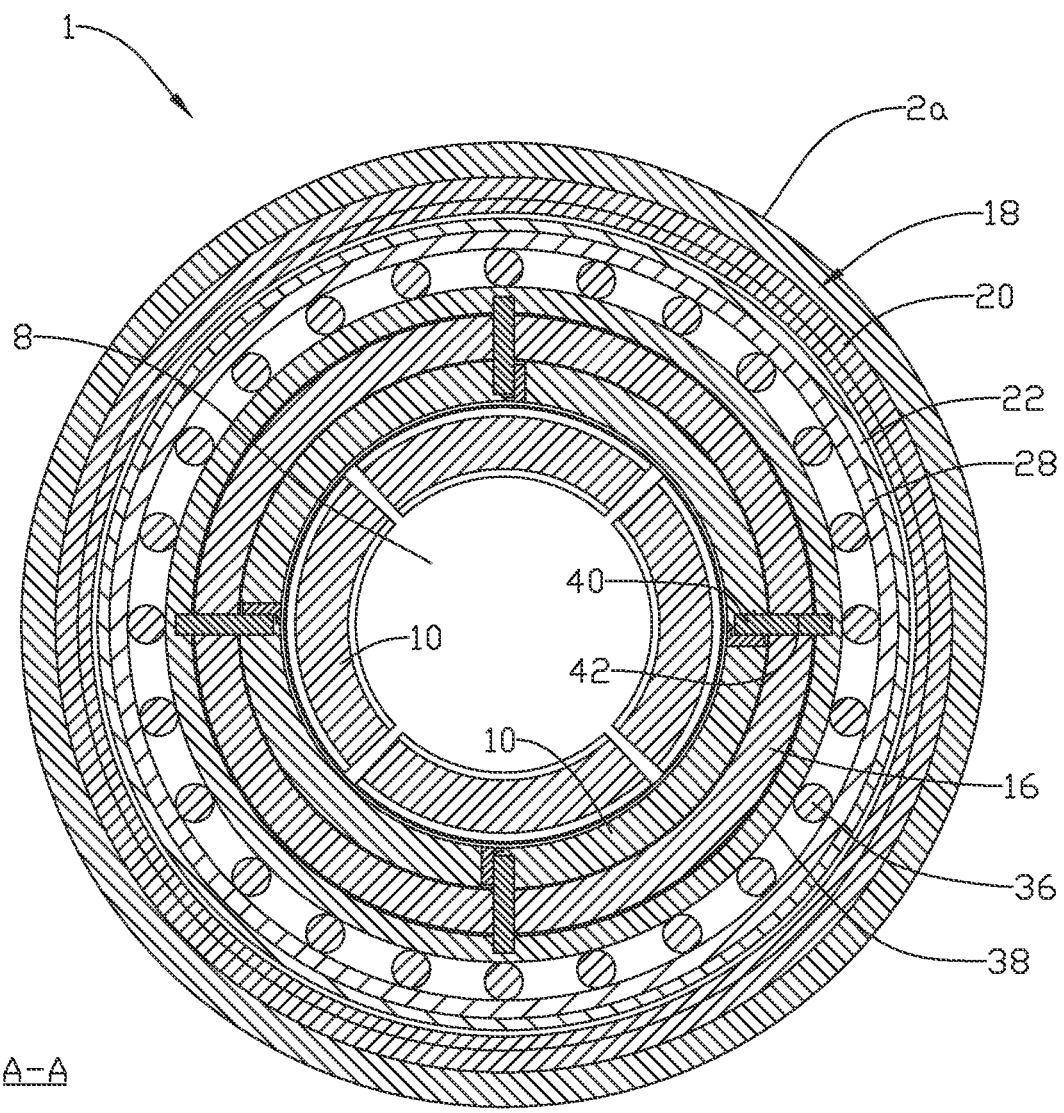
FIG. 3a shows a radial section A-A according to FIG. 1 of the actuator.

FIG. 3*b* shows in greater detail the connection of the actuation ring 38 and the locking ring 14 by means of the dog element 40. When openings in assembly channels 48 in the locking ring 14, respective slits 42 in the partition 16 and respective recesses 50 in the actuation ring 38 are lined up, the dog elements 40 are pushed in through these until a first end portion 40*a* bottoms out in the recesses 50. Each assembly channel 48 in the locking ring 14 is designed with a recess 48*a* next to the through-going opening. The purpose is for a second end portion 40*b* of the dog elements 40 to be able to be brought into the respective recesses 48*a* by rotating the locking ring 14 until it stops against a side face 40*c* of each dog element 40. The open side of each assembly channel 48 is then closed by a plug 52. The dog elements 40 are thereby locked inside the recesses 50 in the actuation ring 38 and the recesses 48*a* in the assembly channel 48 of the locking ring 14 respectively.

The locking segments 10 may hinder assembly of the dog elements 40. This can be solved by at least one of the locking segments 10 being provided with an opening (not shown) for insertion of the dog elements 40 and the plugs 52 through said at least one locking segment 10. The locking segments 10 hang in loose engagement with the engagement portion 2*d* on the inward-protruding assembly flange neck 2*c*, and can be displaced along the engagement portion 2*d* to provide access for assembly of the dog elements 40 via the opening in said at least one locking segment 10. As an alternative to providing said at least one locking segment 10 with the through-going opening that is not shown, the locking segments 10 can be arranged with a certain clearance so that the locking segments 10 can be pushed together during assembly so as to form an adequate opening between two locking segments 10 for access to assembly of the dog elements 40 in the coincident openings formed by the assembly channel 48 in the locking ring 14, the slit 42 in the partition 16 and the recess 50 in the actuation ring 38, as well as insertion of the plugs 52 for locking the dog elements 40.

Figure 4:
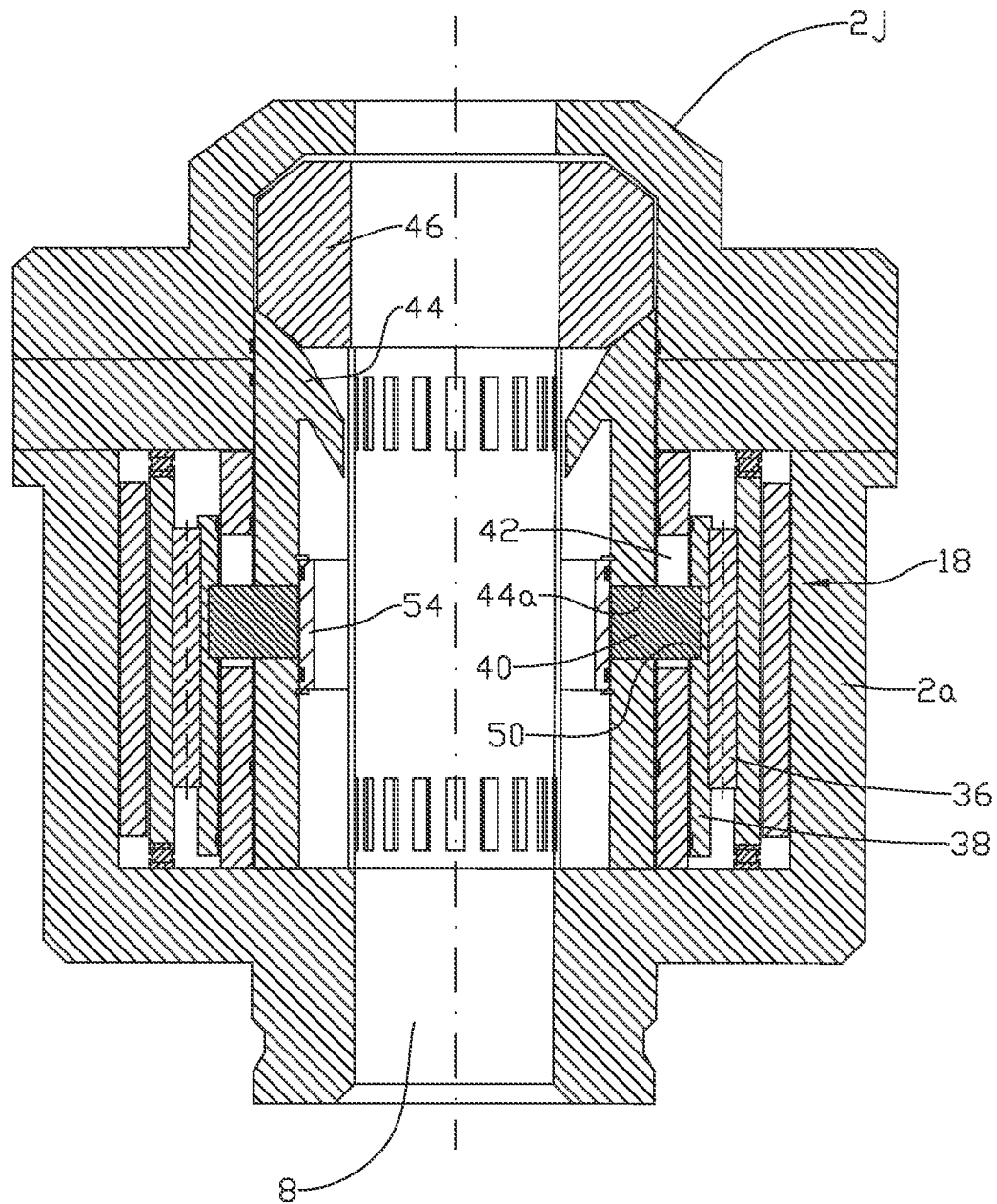
FIG. 4 shows in a smaller scale an axial section through an alternative embodiment of the actuator provided with a sealing device in a blow-out preventer.

Reference is now made to FIG. 4, which shows an alternative embodiment example of the actuator 1 for cooperation with a sealing device in a blow-out preventer. The actuator housing 2 is here shown in an alternative embodiment, wherein the assembly flange 2*b* according to FIGS. 1 and 2 is replaced with an end cover 2*j* that forms an end portion of the centre passage 8. The ring motor 18 and the transmission elements 28, 36 and 38 as well as the dog elements 40 are arranged as described above, while the locking ring 14 according to FIGS. 1-3*b* is replaced with a ring piston 44 that sealingly abuts the partition 16.

The ring piston 44 is arranged to be axially displaceable by the dog elements 40 to compress, respectively unload a flexible, annular sealing element 46 that abuts in a supporting manner the end cover 2*j*. Like the arrangement described above, the dog elements 40 are pushed in through assembly channels 44*a* in the ring piston 44, through the slits 42 in the partition 16 and into the recesses 50 in the actuation ring 38. The dog elements 40 are locked in the cavities in the actuation ring 38 and the ring piston 44 respectively by a ring 54 that is fixed to and sealingly abuts an inside of the ring piston 44.

Reference is again made to FIGS. 1 and 2. A hydraulic axially displaceable piston ring 56 is arranged between the inside of the partition 16 and the external cylindrical end portion 2h of the coupling flange neck 2g. When an underside 56a of the piston ring 56 is pressurised, the piston ring 56 pushes the locking ring 14 to the releasing second end position relative to the locking segments 10 and at the same time drives the transmission elements 28, 36, 38, respectively 28, 32, 36, 38, and the ring motor 18 in reverse, while the motor brake that is not shown is overcome.

Reference is then made to FIGS. 1 and 2, which show rotatable coupling devices 58 for coupling to an external rotation actuator that is not shown, for example a motor on a remote operated vehicle (not shown). The coupling devices 58 can, when needed, drive the transmission elements 28, 36, 38, respectively 28, 32, 36, 38. The rotatable coupling devices 58 can optionally be operated in parallel with the hydraulic piston ring 56 being pressurised to push the locking ring 14 to a releasing position relative to the locking segments 10.

Necessary seals are not described, but are known to a skilled person.

It should be noted that all embodiments mentioned above illustrate the invention, but do not delimit it, and experts on the area will be able to design many alternative embodiments without deviating from the scope of the attached claims. In the claims, the reference numbers in parenthesis shall not be considered delimiting.

The use of the verb "to comprise" and its different forms does not exclude the presence of elements or steps not mentioned in the claims. The indefinite articles "a" or "an" before an element do not exclude the presence of more such elements.

The fact that some features are specified in mutually different dependent claims does not indicate that a combination of these features cannot be used advantageously.

The invention claimed is:

1. An electromechanical actuator for use under water, wherein the electromechanical actuator comprises:
   an annulus that is formed between an actuator housing and a partition, the annulus being delimited in a fluid-sealing manner against a center passage in the actuator;
   an electric ring motor that is arranged enclosed in the annulus;
   an axially displaceable actuator element that is enveloped by the partition, and that is displaceable along an internal partition portion between a first position and a second position;
   a transmission element that is arranged in the annulus axially displaceable along an external partition portion and is connected to the electric ring motor via an assembly of further transmission elements;
   wherein
   the axially displaceable actuator element is connected to the transmission element by at least one dog element that extends in a radial direction of the actuator through respective slits in the partition,
   each slit having an extent in an axial direction of the actuator that facilitates a displacement of the at least one dog element in the axial direction in accordance with the first position and the second position of the axially displaceable actuator element.

2. The electromechanical actuator according to claim 1, wherein
   a first end portion of the at least one dog element is in engagement with a recess in the transmission element, and
   a second end portion of the at least one dog element is in engagement in an assembly channel in the axially displaceable actuator element.

3. The electromechanical actuator according to claim 2, wherein
   the second end portion of the at least one dog element is arranged to be held in a recess in the assembly channel by a plug being inserted into the assembly channel for locking engagement with the assembly channel and the second end portion of the at least one dog element.

4. The electromechanical actuator according to claim 1, wherein
   the axially displaceable actuator element is a locking ring arranged for radial movement of locking segments that are arranged in the center passage of the actuator.

5. The electromechanical actuator according to claim 4, wherein
   the locking ring is provided with radially inward-protruding, heightened first and second end collar portions that are arranged to abut supportingly against radially outward-facing side faces and end portions on the locking segments,
   said first and second end collar portions, in a first, locking end position of the locking ring, being arranged to abut against an outward-facing side face of the locking segments and the a heightened second end portion of the locking segments, the locking segments being pushed radially inwards to a gripping position, and
   said first and second end collar portions, in the second, releasing end position of the locking ring, being arranged to abut against a tapered first end portion of the locking segments and the outward-facing side face, the locking segments being pulled radially outward to a non-gripping position.

6. The electromechanical actuator according to claim 1, wherein
   a hydraulic, axially displaceable piston ring that surrounds a cylindrical end portion of a neck on a coupling flange, is arranged to push a locking ring in the axial direction of the actuator to release a locking grip of a locking segment on an element disposed in the center passage of the actuator.

7. The electromechanical actuator according to claim 1, wherein
   the axially displaceable actuator element is a ring piston arranged for compression of an annular sealing element against an end cover at an end portion of the center passage of the actuator.

* * * * *